United States Patent [19]

Scherzer et al.

[11] 4,079,019

[45] Mar. 14, 1978

[54] PROCESS FOR PREPARING ZEOLITE CONTAINING HYDROCARBON CONVERSION CATALYSTS

[75] Inventors: Julius Scherzer; David Evan William Vaughan, both of Columbia; John Storey Magee, Cooksville, all of Md.

[73] Assignee: W. R. Grace & Co., New York, N.Y.

[21] Appl. No.: 659,080

[22] Filed: Feb. 18, 1976

[51] Int. Cl.$^2$ .......................... B01J 37/02; B01J 29/06
[52] U.S. Cl. .................................. 252/453; 252/455 Z
[58] Field of Search ............................. 252/453, 455 Z

[56] References Cited

U.S. PATENT DOCUMENTS

| | | | |
|---|---|---|---|
| 2,302,297 | 11/1942 | Connolly | 252/453 |
| 2,861,945 | 11/1958 | Kearby et al. | 252/453 X |
| 3,860,532 | 1/1975 | Takase et al. | 252/453 |
| 3,912,619 | 10/1975 | Magee Jr., et al. | 252/455 Z |

Primary Examiner—Carl F. Dees

Attorney, Agent, or Firm—Arthur P. Savage; William W. McDowell, Jr.

[57] ABSTRACT

Attrition resistant and stable catalyst composition comprising crystalline aluminosilicate zeolites e.g. rare earth exchanged zeolites dispersed in an inorganic matrix containing synthetic amorphous silica-alumina and clay are prepared by a process which reduces the level of polluting ammonium salts by eliminating the use of ammonium hydroxide in the steps prior to primary filtration. During the synthesis of the amorphous inorganic matrix wherein alkali metal silicate and aluminum salt solutions are gelled and subsequently combined with zeolitic materials, the ammonia reagent is replaced by non-polluting additives such as magnesium or calcium hydroxides (or oxides) prior to a primary filtration stage without decreasing the catalytic activity of the resulting zeolite promoted hydrocarbon conversion catalysts.

6 Claims, No Drawings alum solution $(Al_2(SO_4)_3 \cdot 18 H_2O)$ containing 28g liter $Al_2O_3$ was pumped into the same reactor at a rate of 30ml solution per minute. The two solutions were collected under stirring for 10 minutes 42 seconds. Gelation of the stream occurred within this time at temperatures of about 20° to 30° C. The pH of the gelled slurry was about 9.8. The slurry was aged for 10 minutes at a temperature of about 25° C., with stirring. Thereafter 22.7g of sodium aluminate solution containing 24 percent by weight $Al_2O_3$ was added to the slurry and the pH increased to 11.5. The slurry was then aged for 10 minutes at a temperature of about 30° C., with stirring. Then 166.3ml of concentrated alum solution containing 77.2g per liter $Al_2O_3$ was added to the aged slurry at which time the pH dropped to 4.1. A suspension of 1 part magnesium hydroxide $(Mg(OH)_2)$ in 5 of water was added to this slurry slowly and with stirring, until the pH increased to 5.8. The addition of the total amount of 16g of the magnesium hydroxide was done slowly and in small amounts in order to reach an equilibrium pH of 5.8. 35g (dry basis) of a commercial NaY zeolite i.e. a synthetic Y type sodium faujasite having a silica to alumina ratio of 4.9 was blended with 100 ml of water and added to the gelled slurry. This addition increased the pH of the mixture to 5.9. The slurry containing the zeolite was aged for 30 minutes at a temperature of about 25° C., by recirculation with a Masterflex pump. After aging the slurry was filtered undered vacuum to obtain a catalyst filter cake which was reslurried in water to about 12% solids slurry and filtered again. The filter cake was oven dried at a temperature of about 120° C for about 3 hours. The dried zeolite containing catalyst cake was pulverized in a mill and washed twice with an aqueous 5% ammonium sulfate solution for 5 minutes each at a temperature of about 70° C. The washing procedure was accomplished each time by slurrying the catalyst cake with the ammonium sulfate solution to obtain about 20% solids slurry, filtering the slurry and repeating the wash procedure using a fresh ammonium sulfate solution. The ammonium sulfate washed catalyst composition was filtered and the cake was washed twice with water of pH 4.0 for 5 minutes each at 70° C. The pH of the water was adjusted to the desired value with diluted hydrochloric acid. The washing procedure with the acidified water was identical to that outlined in the preceeding ammonium sulfate wash. After washing with the acidified water, the cake was slurried in deionized water to about 25% solids slurry and exchanged with a commercial rare earth chloride solution (51.3 wt.% $RECL_3 \cdot 6H_2O$ having a specific gravity of 1.439). 20.2 g of this rare earth chloride solution per 100 g (dry basis) catalyst was added to the slurry. The pH of the slurry was adjusted to 4.9 with diluted hydrochloric acid. The mixture was then heated for 30 minutes at a temperature of 70° C., with stirring, and then filtered. The rare earth exchanged catalyst filter cake was finally washed twice with deionized water possessing a pH of 6.0, for 10 minutes each. Again the washing procedure with the deionized water at about 20% solids slurry was identical to that outlined in the ammonium sulfate wash. The washed material was oven dried at a temperature of 175° C for about 5 hours to obtain a rare earth exchanged zeolite promoted catalyst composite. This catalyst will hereinafter be designated as sample A-1. The chemical composition and physical properties of sample A-1 are given in Table I and its catalytic activity data is listed in Table III.

To establish the affect of different rare earth input upon the catalytic activity of the catalyst, experiments were carried out as described in Examples 2 to 4.

EXAMPLE 2

A rare earth exchanged zeolite containing catalyst was prepared by the same procedure in example 1, except that during the rare earth exchange step 16 g of the rare earth chloride solution was used per 100 g (dry basis) of catalyst. Analytical and catalytic activity data for this catalyst designated as Sample A-2 are given in Table I and Table III, respectively.

EXAMPLE 3

A rare earth exchanged zeolite containing catalyst was prepared as outlined in Example 1, except for using 13 g of the rare earth chloride solution per 100 g (dry basis) of catalyst during the rare earth ion exchange step. Analytical and catalytic activity data for this catalyst, designated as Sample A-3, are given in Table I and Table III, respectively.

EXAMPLE 4

Example 1 was repeated except that in the rare earth ion exchange step, 10g of the rare earth chlorite solution was used per 100g (dry basis) of catalyst. Analytical and catalytic activity data for the resulting rare earth exchanged zeolite containing catalyst, designated as sample A-4 are given in Table I and Table II, respectively.

The use of magnesium oxide (MgO) instead of the conventional ammonia to adjust the pH prior the primary filtration step is illustrated in Examples 5 and 6.

EXAMPLE 5

Example 1 was repeated except that after the addition of the concentrated alum solution to the slurry, the pH of the mixture was raised to 5.9 by the addition of a slurry of about 10g MgO suspended in water in a ratio of 1:5, respectively; and in the subsequent step 32g (dry basis) of NaY zeolite was added to the slurry. The pH of the mixture increased to 6.0. Analytical and catalytic activity data for the resulting rare earth exchanged zeolite containing catalyst, designated as sample A-5 are given in Table I and Table III, respectively.

EXAMPLE 6

Example 1 was repeated except that subsequent to the addition of the concentrated alum solution, the pH of the slurry was increased to 5.8 by the addition of about 10g of MgO suspended in water in a ratio of 1:5, respectively. Analytical and catalytic activity data for the resulting catalyst composition, designated as Sample A-6 are given in Table I and Table III, respectively.

The use of calcium hydroxide $(Ca(OH)_2)$ or calcium oxide (CaO), instead of the conventional ammonia in the pH adjustment step prior to primary filtration is illustrated in the following examples 7 to 10.

EXAMPLE 7

A rare earth exchanged zeolite containing catalyst was prepared by the same procedure described in Example 1 except that after the addition of the concentrated alum solution, about 13g of $Ca(OH)_2$ suspended in water in a ratio of 1:5 was used to adjust the pH of the slurry to 5.8; and during the rare earth exchange step, 16g instead of 20.2g of rare earth chloride solution was used per 100g (dry basis) of catalyst. Analytical and catalytic activity data for this catalyst designated as Sample A-7 are shown in Table I and Table III, respectively.

EXAMPLE 8

The preceeding Example 7 was repeated except that during the rare earth exchange step 13g instead of 16g of solution was used per 100g (dry basis) of catalyst. Analytical and catalytic activity data for the resulting catalyst composition, designated as Sample A-8 are shown in Table I and Table III, respectively.

EXAMPLE 9

Example 7 was repeated except that CaO instead of $Ca(OH)_2$ was utilized in the pH adjustment step. In this step, the pH of the slurry was adjusted to 5.8 using a suspension of about 8g of CaO in water in a ratio of 1:5, respectively. Analytical and catalytic activity data for the resulting rare earth exchanged zeolite catalyst, designated as Sample A-9 are shown in Table I and Table II.

EXAMPLE 10

Example 1 was repeated except that after the addition of the concentrated alum solution, the pH of the slurry was adjusted to 5.8 with about 8g of CaO suspended in water in a ratio of 1:5, respectively; and during the rare earth exchange step, 13g of the rare earth chloride solution was used per 100g (dry basis) of catalyst. Analytical and catalytic activity data for this catalyst material designated as Sample A-10 are given in Table I and Table III, respectively.

EXAMPLE 11

This example illustrates the preparation of prior art catalysts. A catalyst was prepared by the procedure described in Example 1, but using the conventional procedure of neutralization with ammonia, instead of the alkaline earth hydroxides of this invention in the step subsequent to the addition of the concentrated alum solution. The data for the rare earth exchanged zeolite containing catalyst, designated as Sample A-11 is listed in Table I and III.

The following examples 12–20 illustrate the preparation of zeolite containing catalysts of this invention wherein the zeolite initially added to the reaction mixture is a zeolite which has been previously modified e.g., cation and/or thermally stabilized.

EXAMPLE 12

A sodium silicate solution having 4.0 percent by weight $SiO_2$ and 1.4 percent by weight $Na_2O$ and containing commercially available kaolin clay sold under the designation WP kaolin dispersed therein was prepared. This solution contained 23.0g (dry basis) clay per liter of solution. The sodium silicate solution, containing the clay was pumped into a reactor at the rate of 189 ml. solution per minute. At the same time, the dilute alum solution $(Al_2(SO_4)_3 \cdot 18H_2O)$ containing 25.7g per liter $Al_2O_3$ was pumped into the same reactor at a rate of 30 ml. solution per minute. The two solutions were collected under stirring for 10 minutes 42 seconds. Gelation of the stream occurred within this time at temperature of about 35° C. The pH of the gelled slurry was about 10.5. The slurry was initially aged 10 minutes at a temperature of about 35° C., with stirring. Thereafter 28.5g of sodium aluminate solution containing 24 percent by weight $Al_2O_3$ was added to the slurry and the pH increased to 11.8. The slurry was then aged for one hour at a temperature of about 35° C., with stirring. 191.5 ml of concentrated alum solution containing 77.2 g per liter $Al_2O_3$ was added to the aged slurry to produce a pH of 4.1. A suspension of 1 part magnesium hydroxide $(Mg(OH)_2)$ in 5 parts of water was added to this slurry slowly and with stirring, until the pH increased to 7.5. The addition of the total amount of 34 g of $Mg(OH)_2$ was done slowly and in small portions in order to reach an equilibrium pH of 7.5. 20.3 g (dry basis) of zeolite was blended with 100 ml of water and added to the slurry. The pH dropped to 7.3 upon the addition of the zeolite which was a calcined rare earth exchanged Y zeolite (CREY) containing about 17 to 19 wt. % rare oxides $(RE_2O_3)$ and about 3.0 wt. % $Na_2O$. Thereafter, about 1.0g of $Mg(OH)_2$ was added in order to raise the pH to 7.5. The slurry containing the zeolite was aged under stirring for 90 minutes at a temperature of about 35° C. by recirculation with a Masterflex pump. After aging, the slurry was filtered under vacuum to obtain a catalyst filter cake which was reslurried in water to about 12% solids slurry and filtered again. The cake was oven dried at a temperature of 120° C. for about 3 hours. The dried cake was pulverized in a mill and washed 5 times with a 5% ammonium sulfate solution at a pH of about 7.5 at a temperature of about 70° C. for 10 minutes each wash to remove the soluble impurities, particularly to reduce the $Na_2O$ content. The washing procedure was accomplished each time by slurrying the catalyst cake with the ammonium sulfate solution to obtain about 12% solids slurry, filtering the slurry and repeating the wash procedure using a fresh ammonium sulfate solution. The ammonium sulfate washed catalyst composition was filtered and the cake was washed three times with 1500 ml of water having a pH of 9.0 at 70° C., for 10 minutes each wash. The pH of the water was adjusted to the desired value with a weak ammonia solution. The washing procedure with the alkaline water was identical to that outlined in the preceeding ammonium sulfate wash. The cake was finally washed 3 times with deionized water, at 70° C. for 10 minutes each wash following the aforedescribed washing procedures. The washed material was oven dried at a temperature of 175° C. for 5 hours to obtain a rare earth exchanged zeolite containing catalyst composite. This catalyst will hereinafter be designated as Sample B-12. The chemical composition and physical properties of sample B-12 are given in Table II and its catalytic activity data is listed in Table III.

EXAMPLE 13

Example 12 was repeated except that the level of the CREY zeolite imput was increased to 22.3g (dry basis) of the CREY zeolite. Analytical and catalytic activity data for the resulting rare earth exchanged zeolite containing catalyst, designated as Sample B-13 are given in Table II and Table III, respectively.

EXAMPLE 14

A rare earth exchanged zeolite containing catalyst was prepared by the same procedure as in Example 12, except for the following changes; (a) after the addition of the sodium aluminate solution, the aging time was reduced to 35 minutes (b) subsequent to the addition of the concentrated alum solution, a total of 24.0 g of $Mg(OH)_2$ suspended in water in a ratio of 1:5, respectively was added to reach an equilibrium pH of 7.0 (c) 22.3 g (dry basis) of the CREY zeolite was added to the matrix component containing slurry at which time the Subsequent to this aging step the mixture is then combined with additional quantity of an aluminum salt as previously described, preferably alum solution sufficient to bring the alumina content of the synthetic amorphous silica-alumina hydrogel to desired level of from about 27 to 33 percent by weight alumina in the finished catalyst. In general, the aluminum salt added in this step is in the form of an aqueous solution having an aluminum salt concentration of from about 70 to 80 grams of $Al_2O_3$ per liter.

Subsequent to the admixing with an additional quantity of the aluminum salt, the pH of the mixture adjusted from about 4.0 to 5.8 by the addition of an aqueous suspension of magnesium and/or calcium hydroxides and/or oxides of these metals in amounts that would import an alkaline earth metal oxide content below about 3.0 percent by weight.

Although the aforementioned calcium and magnesium compounds are preferred oxides and hydroxides of other alkaline earth metals such as beryllium, strontium or barium may be utilized to adjust the pH to the desired range.

Aqueous suspension of the magnesium or calcium hydroxides or oxides are added slowly with agitation to the slurry reaction mixture until the equilibrium pH is reached. Generally, the alkaline earth compound to water weight ratio of the suspension can be within the range from 1.0:5.0 to 1.0:20.

After adjusting the pH with the alkaline earth compound the zeolite component is added in amounts required to impart the desired concentration thereof in the finished catalyst composite. Generally, the catalyst composition of this invention will contain from about 5.0 to 25 percent by weight, preferably 10 to 20 percent by weight, of the zeolite promoter measured on a silica-alumina basis.

The preferred zeolite materials utilized in either of the embodiments of this invention are synthetic faujasites which possess a silica to alumina ratio of from about 2.5 to 7.0, and preferably 3.0 to 6.0 and most preferably 4.5 to 6.0. These synthetic faujasites are widely known crystalline aluminosilicate zeolites and common examples of the synthetic faujasites designated as Type X and Type Y zeolites are commercially available from the Linde Division of Union Carbide Corporation. In addition, to the faujasites, the other widely known types of zeolitic materials such as mordenite, erionite and the like can be used. The preferred synthetic faujasites i.e. zeolite Y such as described in U.S. Pat. No. 3,130,007 possess a high silica to alumina ratio and are normally in the sodium form. However, they may be in any of the other alkali metal forms. By the term "alkali metal" it is intended to include the elements of Group I-A, lithium through cesium. Zeolite X is described in greater detail in U.S. Pat. No. 2,882,244.

In one embodiment of this invention the synthetic faujasite is added to silica-alumina hydrogel containing mixture in the alkali metal form and subsequently modified e.g. ion exchanged according to the process outlined herein. In another embodiment, the synthetic faujasites are further modified e.g. cation and/or thermally stabilized prior to addition to the silica alumina hydrogel slurry. Thus, in the latter embodiment, the preferred zeolites are the synthetic faujasites i.e. crystalline aluminosilicate zeolitic materials possessing the aforedescribed silica to alumina ratios and furthermore, which possess considerable thermal stability at temperatures on the order of 800° to 925° C. Typical examples of zeolite promoters which may be used in the preparation of the subject catalysts are calcined rare earth exchanged X (CREX) and preferably Y zeolites which are fully described in U.S. Pat. No. 3,402,996. In addition to rare earth exchanged zeolites, hydrogen exchanged faujasites such as hydrogen X and Y zeolites which have undergone further treatment to enhance the stability thereof may also be used. Typical stabilized hydrogen exchanged zeolites are identified as Z-14 US and fully described in U.S. Pat. Nos. 3,293,192 and 3,449,070. It is also contemplated that the zeolites utilized herein may be of the variety which contain both hydrogen and other stabilizing or catalytically active metals such as found in Group III through Group VIII of the Periodic Table.

The zeolite is preferably added in the form of an aqueous slurry and thoroughly agitated to insure proper blending. Generally, the addition of the zeolite to the silica-alumina hydrogel containing slurry results only in minor changes in the pH of the reaction mixture. Thus prior to the primary filtration the pH of the zeolite containing gelled slurry mixture, if desired, can be adjusted by the addition of necessary amount of the alkaline earth metal hydroxide or oxide utilized in the previous pH adjustment step. Generally, it is desirable to maintain the pH prior to primary filtration within the specified range in the initial step of addition of the alkaline earth metal compound to the gelled silica-alumina mixture.

At this point, if desired, the zeolite containing slurry may be aged for a period from about 30 to 90 minutes at a temperature of 20° to 30° C., preferably with agitation.

Thereafter, the zeolite containing composition is separated from the reaction by any conventional method such as filtration or the like.

The subsequent steps in the process are largely dependent upon the size of the final product desired. For the production of fluid hydrocarbon conversion catalysts, several alternate procedures can be followed. In one procedure, the separated zeolite containing catalyst composition can be reslurried and spray dried to form particles having the desired size.

Spray drying may be accomplished by applying an inlet temperature of about 375° C. and an outlet temperature of about 150° C. and results in catalysts in the form of microspheres having an average diameter of about 75 microns. In an alternate procedure, the separated zeolite containing catalyst composition can first be dried in an oven or similar device. The oven-dried product can then be ground to a fine powder and screened, if necessary, to provide catalyst particles having the size distribution required for fluid catalytic processes. Granular catalyst products in the form of balls, pills, extrudates, and the like can be formed from the spray-dried or ground powders described above by conventional processes. These granular catalyst products are generally utilized in fixed or moving bed catalyst hydroconversion processes and possess particle sizes on the order of ⅛ to ¼ inches.

Subsequent to separating and forming the zeolite containing catalyst composite to particles of desired shape and size, the catalyst material is initially washed with an ammonium salt solution such as an aqueous ammonium sulfate and preferably followed by either acidic or alkaline water washes to remove soluble impurities from the overall catalyst composite. During the washing operations excess alkali metal salts are removed to a level of less than 1 percent by weight and more preferably to less than 0.5 percent by weight of soda (Na$_2$O). The sulfate level is also reduced to below about 0.5 percent by weight, preferably to from about 0.1 to 0.3 percent. During the wash with ammonium ion solutions a major portion of the alkali metal ion incorporated in the faujasite structure is base exchanged with the ammonium ions.

Washing with aqueous solutions having a pH from 5.0 to about 7.5 and containing from 2 to 10 percent by weight of ammonium sulfate at a temperature from about 65° to 80° C. for a period from 3.0 to 10 minutes generally gives satisfactory results.

The pH of the wash solution employed subsequent to the washes with ammonium sulfate is generally dependent on the nature of the zeolite component in the catalyst composite. Thus in one embodiment wherein the zeolite was originally incorporated into the silica-aluminum hydrogel slurry in the alkali metal form it will eventually be further modified by ion exchange e.g. metal cation exchange. In this case, it is desirable to follow the initial wash with solutions of ammonium ion, with washings of acidified water having a pH of about 4.0 to 5.0. The pH of the water is adjusted to the desired value by the addition of a mineral acid, preferably hydrochloric acid.

In the other embodiment wherein the zeolite component added to the matrix forming mixture has been already previously modified to yield the desired catalytic properties e.g. base exchanged with suitable cations, it is preferred that to follow the ammonium ion wash with alkaline water washings having a pH of about 8.0 to 9.0. The desired pH of the water is obtained by the addition of a weak base e.g. ammonia. The temperature and duration of either these acidic or alkaline washes can be within the range in the aforedescribed washes with the ammonium ion solutions.

Subsequent to the above described washing operation, in one embodiment of the invention wherein the zeolite component is originally added to gelled silica-alumina containing reaction mixture in the form of a crystalline alkali metal faujasite, it is desirable to subject this zeolite-gel matrix composite to ion exchange with suitable cations to yield the desired catalytic properties.

The zeolite containing catalyst maybe ion exchanged with cations of metals in Groups III to Group VIII or hydrogen containing cations or a mixture thereof. Such ion exchange treatments and the procedures for conducting the exchanges are well known to those skilled in the art. It is particularly preferred in the practice of this invention to ion exchange the zeolite with rare earth salt solutions. As used herein the term "rear earth elements" include elements from lanthanum to lutecium, atomic numbers 57 to 71 inclusive. A large variety of rare earth compounds may be employed as a source of rare earth ions, the only limitation being that the rare earth salt be sufficiently soluble in the solvent, usually water, to provide the required amount of rare earth content of the zeolite. Suitable compounds include but are not limited to rare earth chlorides, nitrates, formates, etc. The rare earth salts may be employed as single rare earth metal or a mixture of rare earth cations, such as rare earth chloride or didymium chloride. This exchange is normally accomplished by using a commercially available rare earth chloride solution containing chlorides of rare earth mixtures. The rare earth salt solution generally, contains about 20 to 30 percent by weight rare earth ions expressed as RE$_2$O$_3$. It is generally found that a satisfactory exchange takes place when from about 15 to 22 grams of this rare earth solution per 100 grams (dry basis) of zeolite containing catalyst are utilized. The rare earth solution is preferably maintained at a pH from about 4.5 to 5.0 during the exchange procedure. This pH is obtained by the addition of mineral acid while the exchange is taking place. The rare earth exchange procedure is continued until up to about 5.0 percent by weight rare earth (RE$_2$O$_3$) and preferably 2.0 to 4.0 percent by weight is incorporated into the catalyst compositions. Generally satisfactory exchange can be obtained by mixing the washed catalyst particles with the rare earth solution for a period of about 15 to 60 minutes at temperature of about 70° to 90° C. The exchange solution is separated e.g. by filtration from the catalyst particles.

In the final processing steps the zeolite containing catalyst composites are generally subjected to a final wash with deionized water and then dried.

The catalyst is then preferably dried at a temperature of from about 120° to 200° C. to reduce the moisture level below about 30% by weight.

The zeolite containing catalyst compositions prepared according to the process of this invention possess high catalytic activity, particularly for cracking of hydrocarbons. When subjected to standard microactivity tests the catalyst composites typically demonstrate activity in the range of 75 to 85% conversion. In addition the catalyst composites of this invention possess good physical properties e.g. desirable surface area characteristics and particulary satisfactory degree of attrition resistance. It is found that typical catalyst composition prepared herein possess Davison Attrition Indexes (DI) on the order of about 15 to 50 and Jersey Indexes (JI) on the order of about 1.0 to 4.0. The Davison Attrition Index (DI) as referred to in the following examples is determined as follows:

A 7 g sample is screened to remove particles in the 0 to 20 micron size range. The particles above 20 microns are then subjected to a 5 hour test in the standard Rolier Particle Size Analyzer using a 0.07 inch jet and 1 inch I.D.U-Tube as supplied by American Instrument Company, Silver Spring, Maryland. An airflow of 9 liters per minute is used. The Davison Index is calculated as follows:

Davison Index (DI) = 0.20 micron material formed during test/Original 20 + micron fraction X 100.

It is understood that the foregoing detailed description is given merely by way of illustration and that many variations and modifications may be made therein without departing from the spirit of the invention.

The following examples are meant to illustrate, but not to limit the invention. All parts and percentages are by weight, unless otherwise specified.

The following examples 1–10 illustrate the preparation of zeolite containing catalysts according to the improved process of this invention wherein the zeolite initially added to the reaction mixture containing the matrix forming components is in the alkali metal form and subsequently exchanged with rare earth ions.

EXAMPLE I

A sodium silicate solution having 4.0 percent by weight SiO$_2$ and 1.4 percent by weight Na$_2$O and containing commercially available kaolin dispersed therein was prepared. This solution contained 22.6g (dry basis) clay per liter of solution. The sodium silicate solution, containing clay was pumped into a reactor at the rate of 189 ml solution per minute. At the same time, the dilute pH of the mixture dropped to 6.9 and was not readjusted, i.e. the subsequent step in which additional Mg(OH)$_2$ is added was therefore eliminated. Analytical and catalytic activity data for the catalyst product, designated as Sample B-14 are given in Table II and Table III, respectively.

EXAMPLE 15

A rare earth exchanged zeolite catalyst was prepared by the same procedure as in Example 12, except for the following changes: (a) after the addition of the sodium aluminate solution, the aging time was reduced to 20 minutes (b) subsequent to the addition of the concentrated alum solution, a total of 16.0 g of Mg(OH)$_2$ suspended in water in a ratio of 1:5, respectively was added to reach an equilibrium pH of 6.0 (c) 22.3 g (dry basis) of the CREY zeolite was added to the matrix component containing slurry at which time the pH of the mixture dropped to 5.8 and was not readjusted, i.e. the subsequent step in which additional Mg(OH)$_2$ is added was therefore eliminated. Analytical and catalytic activity data for the catalyt product, designated as Sample B-15 are given in Table II and Table III, respectivelyl

EXAMPLE 16

A rare earth exchanged zeolite containing catalyst was prepared using the identical procedure as in Example 12 except for the following changes: (a) during the gelation of the sodium silicate solution with the dilute alum solution, the addition rate of the silicate solution was left unchanged but the flow rate of the alum solution was set at 31.5 ml per minute. The pH of the gelled slurry resulting at this stage was 9.8 (b) after the addition of the sodium aluminate solution, the aging time was reduced to 10 minutes (c) subsequent to this aging period 186.2 ml of concentrated alum solution, was added (d) following the addition of the concentrated alum solution a total of 16.5 g of Mg(OH)$_2$ suspended in water in ratio of 1:5, respectively, was added to reach an equilibrium pH of 6.0 (e) 22.3 g (dry basis) of the CREY zeolite was added to the matrix component containing slurry at which time the pH of the mixture dropped to 5.8 and was not readjusted, i.e. the subsequent step in which additional Mg(OH)$_2$ is added was therefore eliminated. Analytical and catalytic activity data for the catalyst product, designated as Sample B-16 are given in Table II and Table III, respectively.

The use of calcium hydroxide (Ca(OH)$_2$) or calcium oxide (CaO) instead of the conventional ammonia in the pH adjustment step prior to primary filtration is illustrated in the next two examples.

EXAMPLE 17

A rare earth exchanged zeolite containing catalyst was prepared using the identical procedure as in Example 12 except for the following changes: (a) subsequent to the addition of the concentrated alum solution about 15 g of Ca(OH)$_2$ suspended in water in a ratio of 1:5, respectively, was employed to rase the pH to an equilibrium value of 7.5. (b) 22.3 g (dry basis) of the CREY zeolite was added to the matrix component containing slurry at which time the pH of the mixture dropped to 7.2 (c) subsequent to the addition of the zeolite promoter, Ca(OH)$_2$ suspension was added to bring the pH back to 7.5. Analytical and catalytic activity data for the catalyst product, designated as Sample B-17 are listed in Table II and Table III, respectively.

EXAMPLE 18

A rare earth exchanged zeolite containing catalyst was prepared using the identical procedure as in Example 12 except for the following changes: (a) during the gelation of the sodium silicate solution with the dilute alum solution the addition rate of the silicate solution was left unchanged but the flow rate of the alum solution was set at 31.5 ml per minute. The pH of the gelled slurry resulting at this stage was 9.8 (b) after the addition of the sodium aluminate solution, the aging time was reduced to 10 minutes (c) subsequent to this aging period 186.2 ml of concentrated alum solution was added (d) following the addition of the concentrated alum alum solution about 11.0 g of the calcium hydroxide suspended in water in a ratio of 1:5 was added to reach an equilibrium pH of 6.0 (e) 22.3g (dry basis) of the CREY zeolite was added to the matrix component containing slurry at which time the pH of the mixture dropped to 5.8 and was not readjusted i.e. the subsequent step in which additional Ca(OH)$_2$ is added was therefore eliminated. Analytical and catalytic activity data for the catalyst product, designated as Sample B-18 are given in Table II and Table III, respectively.

EXAMPLE 19

A rare earth exchanged zeolite containing catalyst was prepared using the identical procedure as in Example 12 except for the following changes: (a) during the gelation of the sodium silicate solution with the dilute alum solution, the addition rate of the silicate solution was left unchanged but the flow rate of the alum solution was set at 31.5 ml per minute. The pH of the gelled slurry resulting at this stage was 9.8 (b) after the addition of the sodium aluminate solution, the aging time was reduced to 20 minutes (c) subsequent to this aging period 186.2 ml of concentrated alum solution, was added (d) following the addition of the concentrated alum solution of 13 g of the CaO suspended in water in a ratio of 1:5, respectively was added to reach an equilibrium pH of 6.0. 22.3 g (dry basis) of the CREY zeolite was added to the matrix component containing slurry at which time the pH of the mixture dropped to 5.8 and was not readjusted, e.g. the subsequent step in which additional Ca(OH)$_2$ is added was therefor eliminated (f) the aging time of the slurry containing the added zeolite was reduced to 45 minutes (g) the washing of the dried pulverized catalyst cake with the ammonium sulfate solution was done only three times (h) the subsequent wash with the alkaline water of pH 9.0 was done only twice for 10 minutes each wash at 70° C. Analytical and catalytic activity data for the catalyst product, designated as Sample B-19 are given in Table II and Table III, respectively.

EXAMPLE 20

In this example, the conventional pH adjustment step with ammonia was replaced by using a calcium hydroxide-magnesium hydroxide mixture i.e. hydrated dolomitic lime. A rare earth exchanged zeolite promoted catalyst was prepared using the same procedure as in Example 12 except for the following changes: (a) subsequent to the addition of the concentrated alum solution, about 34 g of hydrated dolomitic lime (Ca(OH)$_2$·Mg(OH)$_2$) slurried in water in a ratio of 1:5, respectively, was added slowly, under stirring, to bring up the equilibrium pH to 7.5 (b) the washing of the dried pulverized catalyst cake with the ammonium sulfate solution was done only three times (c) the subsequent wash with the alkaline water of pH 9.0 was done only twice (d) the final wash with the deionized water was repeated only twice. Analytical and catalytic activity data for the run at 900° F. at a weight hourly space velosity of 16 using a feed of West Texas Devonian gas oil, 500°–800° F. cut and at a catalyst to oil ratio of 5.8. The results are tabulated in Table III below.

Table I

| Catalyst Sample No. | A-1 | A-2 | A-3 | A-4 | A-5 | A-6 | A-7 | A-8 | A-9 | A-10 | A-11 |
|---|---|---|---|---|---|---|---|---|---|---|---|
| Additive | $Mg(OH)_2$ | $Mg(OH)_2$ | $Mg(OH)_2$ | $Mg(OH)_2$ | MgO | MgO | $Ca(OH)_2$ | $Ca(OH)_2$ | CaO | CaO | $NH_4OH$ |
| $Al_2O_3$, wt. % | 28.2 | 27.8 | 28.4 | 28.2 | 26.8 | 27.4 | 28.0 | 27.9 | 29.2 | 28.8 | 28.1 |
| $M_xO_y$, wt. % | 0.44 | 0.65 | 0.77 | 1.0 | 0.56 | 0.45 | 1.49 | 1.67 | 1.93 | 2.55 | — |
| $RE_2O_3$, wt. % | 5.19 | 4.05 | 3.21 | 2.29 | 5.41 | 5.10 | 3.01 | 2.45 | 3.11 | 3.02 | 4.5 |
| $Na_2O$, wt. % | 0.62 | 0.73 | 0.76 | 0.75 | 0.55 | 0.71 | 0.42 | 0.45 | 0.37 | 0.38 | 0.52 |
| $SO_2^-$, wt. % | 0.19 | 0.11 | 0.16 | 0.14 | 0.17 | 0.15 | 0.27 | 0.27 | 0.26 | 0.24 | 0.19 |
| Peak Height, mm | 76 | 64 | 66 | 66 | 68 | 72 | 83 | 84 | 76 | 78 | 67 |
| Bulk density in $g/cc^3$ | 0.50 | 0.46 | 0.46 | 0.46 | 0.49 | 0.44 | 0.41 | 0.47 | 0.40 | 0.41 | 0.50 |
| DI | 50 | 32 | 32 | 32 | 28 | 35 | 45 | 28 | 45 | 53 | 44 |
| JI | 2.6 | 3.0 | 3.0 | 3.0 | 2.1 | 2.9 | 2.6 | 2.3 | 2.5 | 3.6 | 2.9 |
| SA ($m^2/g$) after 2 hrs. at 1000° F. | 350 | 342 | 343 | 351 | 325 | 303 | 344 | 310 | 356 | 318 | 324 |

$M_xO_y$ - the alkaline earth content desired from the above additives, magnesium expressed as MgO, calcium as CaO.
DI - Davison Attrition Index
JI - Jersey Attrition Index
SA - surface area Table II

| Catalyst Sample No. | B-12 | B-13 | B-14 | B-15 | B-16 | B-17 | B-18 | B-19 | B-20 |
|---|---|---|---|---|---|---|---|---|---|
| Additive | $Mg(OH)_2$ | $Mg(OH)_2$ | $Mg(OH)_2$ | $Mg(OH)_2$ | $Mg(OH)_2$ | $Ca(OH)_2$ | $Ca(OH)_2$ | CaO | $Ca(OH)_2 \cdot Mg(OH)_2$ |
| $Al_2O_3$, wt. % | 29.6 | 27.2 | 29.2 | 29.6 | 29.8 | 30.6 | 32.3 | 32.5 | 30.6 |
| $M_xO_y$, wt. % | 1.4 | 3.2 | 0.8 | 0.2 | 0.06 | 2.7 | 0.11 | 1.1 | 1.0(0.2)* |
| $RE_2O_3$, wt. % | 2.1 | 2.3 | 2.16 | 2.36 | 2.82 | 2.37 | 2.51 | 2.13 | 1.96 |
| $Na_2O$, wt. % | 0.06 | 0.06 | 0.08 | 0.04 | 0.04 | 0.05 | 0.04 | 0.04 | 0.09 |
| $SO_2$, wt. % | 0.34 | 0.31 | 0.16 | 0.16 | 0.10 | 0.21 | 0.17 | 0.66 | 0.17 |
| Peak Height, mm. | 49 | 52 | 45 | 48 | 58 | 58 | 63 | 62 | 56 |
| Bulk density in $g/cc^3$ | 0.44 | 0.40 | 0.45 | 0.53 | 0.57 | 0.4 | 0.5 | 0.5 | |
| DI | 29 | 18 | 29 | 16 | 14 | 36 | 31 | 27 | 22 |
| JI | 4.1 | 2.0 | 4.1 | 1.9 | 1.7 | 29 | 3.3 | 1.7 | 1.6 |
| SA ($m^2/g$) after 2 hrs. at 1000° F. | 233 | 207 | 241 | 260 | 290 | 241 | 286 | 285 | 276 |
| SA ($m^2/g$) after 2 hrs. at 1650° F. | 63 | 73 | 201 | 137 | 179 | 108 | 108 | 31 | 33 |

$M_xO_y$ - the alkaline earth content desired from the above listed additives, magnesium expressed as MgO, calcium as CaO.
*the number in parenthesis represents wt. % MgO.
DI - Davison Attrition Index.
JI - Jersey Attrition Index.
SA - surface area catalyst product, designated as Sample B-20 are given in Table II and Table III, respectively.

Tables I and II below shows the chemical composition and physical properties of the various zeolite containing catalyst composites prepared in Examples 1–20. It is to be noted that in Table I and also Table III, Sample A-11 is the prior art catalyst composition prepared according to the conventional procedure of using ammonia in the pH control step prior to primary filtration. As shown in the respective examples in the preparation of the catalyst samples A-1 to A-10, listed in Talbe I, the zeolite was added as the sodium Y type faujasite and subsequently exchanged with the rare earth ions. In Table II which shows the various data obtained for samples B-12 to B-20, the zeolite CREY was modified prior to addition to the matrix forming catalyst components.

EXAMPLE 21

To illustrate the catalytic activity of the catalysts of the present invention, the catalysts prepared in Examples 1 to 20 were subjected to microactivity tests as outlined by Ciapetta and Henderson, Oil and Gas Journal, Oct. 16, 1967. The catalyst samples were first pretreated by steaming at 1350° F. for a period of 8 hours in 100% steam at 15 p.s.i.g. Catalytic evaluations were Table III

| Catalyst Sample No. | Conversion Vol. Percent |
|---|---|
| A-1 | 74 |
| A-2 | 72 |
| A-3 | 77 |
| A-4 | 70 |
| A-5 | 74 |
| A-6 | 74 |
| A-7 | 74 |
| A-8 | 75 |
| A-9 | 77 |
| A-10 | 74 |
| A-11 | 76 |
| B-12 | 80 |
| B-13 | 79 |
| B-14 | 78 |
| B-15 | 76 |
| B-16 | 79 |
| B-17 | 84 |
| B-18 | 78 |
| B-19 | 78 |
| B-20 | 75 |

What is claimed is:
1. In a process for preparing a hydrocarbon conversion catalyst which includes the steps of:
(a) combining a alkali metal silicate solution with an aluminum salt solution to provide an aqueous slurry of silica-alumina hydrogel having a pH of about 4,
(b) adjusting the pH of said slurry to a level of about 5 to 7, and
(c) adding a crystalline alumino silicate zeolite to the slurry prior to processing the mixture to form a particulate catalyst, the improvement comprising:
adjusting said pH at Step (b) to a level of about 5 to 7 by addition of an alkaline earth metal component selected from the group consisting of hydroxides and oxides of magnesium, calcium and mixtures thereof to produce a catalyst which contains alkaline earth metal oxides in amounts up to 3% by weight of said catalyst.

2. The process of claim 1 wherein said zeolite is Type Y zeolite.

3. The process of claim 1 wherein said catalyst composition is exchanged with rare earth ions.

4. The process of claim 1 wherein said salt is aluminum sulfate.

5. The process of claim 1 wherein said catalyst contains up to 30 percent by weight clay.

6. The process of claim 1 wherein alkali metal aluminate is added to said slurry prior to adjusting said pH.

* * * * *

United States Patent [19]

Coupek et al.

[11] 4,079,021
[45] Mar. 14, 1978

[54] POLYMERIC CARRIER FOR A CONTROLLED SYNTHESIS OF PEPTIDES

[75] Inventors: Jiri Coupek, Prague; Vladimir Gut, Uhrineves, both of Czechoslovakia

[73] Assignee: Ceskoslovenska akademie ved, Prague, Czechoslovakia

[21] Appl. No.: 549,830

[22] Filed: Feb. 13, 1975

Related U.S. Application Data

[62] Division of Ser. No. 413,390, Nov. 6, 1973, Pat. No. 3,925,267.

[30] Foreign Application Priority Data

Nov. 6, 1972 Czechoslovakia .................. 7475/72

[51] Int. Cl.$^2$ .............................. C08J 9/00; C08J 9/22
[52] U.S. Cl. .............................. 260/2.5 R; 260/2.5 B; 526/16
[58] Field of Search ............... 260/67 A, 73 L, 80.73, 260/80.81, 2.5 R, 72, 72.5, 17.4 SB, 2.5 B, 2.5 EP, 2.5 H, 2.5 HB, 823, 827, 836, 6; 526/16

[56] References Cited

U.S. PATENT DOCUMENTS

| | | | |
|---|---|---|---|
| 3,575,946 | 4/1971 | Chromocek et al. | 260/86.1 E |
| 3,663,467 | 5/1972 | Albright | 260/2.5 B |
| 3,699,089 | 10/1972 | Wichterle | 260/86.1 E |

*Primary Examiner*—Allan Lieberman

[57] ABSTRACT

An acrylic polymer suitable for use as carrier in the controlled synthesis of polypeptides is provided. The polymer comprises the condensation product of a monomer selected from the group consisting of hydroxyalkyl acrylates and hydroxyalkyl methacrylates, a polyfunctional cross-linking monomer selected from the group consisting of alkylene diacrylates, alkylene dimethacrylates, polyacrylates and polymethacrylates of polyalochols, alkylene bisacrylamides and divinylbenzene, and an aromatic ring-containing compound selected from the group consisting of aromatic acids and their anhydrides and chlorides, aromatic isocyanates, halogenophenylsilanes, and aromatic epoxy compounds. The condensate has its aromatic rings chlormethylated. The first monomer and the polyfunctional cross-linking monomer are copolymerized and the resultant copolymer is condensed with said compounds which contain an aromatic ring.

1 Claim, No Drawings